United States Patent
Chikugo et al.

(10) Patent No.: US 9,847,538 B2
(45) Date of Patent: Dec. 19, 2017

(54) FUEL CELL SYSTEM

(71) Applicant: NISSAN MOTOR CO., LTD., Yokohama-shi, Kanagawa (JP)

(72) Inventors: Hayato Chikugo, Kanagawa (JP); Yousuke Tomita, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/027,403

(22) PCT Filed: Oct. 1, 2014

(86) PCT No.: PCT/JP2014/076328
§ 371 (c)(1),
(2) Date: Apr. 5, 2016

(87) PCT Pub. No.: WO2015/053156
PCT Pub. Date: Apr. 16, 2015

(65) Prior Publication Data
US 2016/0254555 A1    Sep. 1, 2016

(30) Foreign Application Priority Data

Oct. 8, 2013    (JP) .................................. 2013-211319

(51) Int. Cl.
*H01M 8/04111*    (2016.01)
*H01M 8/04089*    (2016.01)
(Continued)

(52) U.S. Cl.
CPC ...... *H01M 8/04111* (2013.01); *H01M 8/0432* (2013.01); *H01M 8/04089* (2013.01);
(Continued)

(58) Field of Classification Search
CPC ..................... H01M 8/04753; H01M 8/04395
See application file for complete search history.

(56) References Cited

U.S. PATENT DOCUMENTS

| | | | |
|---|---|---|---|
| 2002/0001741 A1* | 1/2002 | Kawasumi | .......... H01M 8/0612 |
| | | | 429/423 |
| 2010/0138179 A1* | 6/2010 | Lee | .................... H01M 8/04313 |
| | | | 702/63 |

(Continued)

FOREIGN PATENT DOCUMENTS

| | | |
|---|---|---|
| CA | 2 865 880 A1 | 9/2013 |
| JP | 2007-095434 A | 4/2007 |

(Continued)

*Primary Examiner* — Olatunji Godo
(74) *Attorney, Agent, or Firm* — Foley & Lardner LLP (57) ABSTRACT

A fuel cell system including a cathode gas supply system of a cathode gas bypass type includes a first flow rate sensor which detects a cathode gas flow rate to be supplied by the compressor, a second flow rate sensor which detects a cathode gas flow rate to be supplied to the fuel cell, a bypass valve which controls a cathode gas flow rate flowed in the bypass channel, a bypass valve controlling unit configured to execute an open/shut-off control of the bypass valve in accordance with an operation state of the fuel cell system, and a mismatch diagnosing unit configured to detect a mismatch of detected values of the first flow rate sensor and the second flow rate sensor based on the detected values of the both sensors during total shut-off of the bypass valve.

8 Claims, 7 Drawing Sheets

(51) Int. Cl.
  *H01M 8/0432*   (2016.01)
  *H01M 8/0438*   (2016.01)
  *H01M 8/04537*  (2016.01)
  *H01M 8/04746*  (2016.01)
  *H01M 8/04291*  (2016.01)
  *H01M 8/04992*  (2016.01)
  *H01M 8/1004*   (2016.01)

(52) U.S. Cl.
  CPC ... *H01M 8/04291* (2013.01); *H01M 8/04395* (2013.01); *H01M 8/04425* (2013.01); *H01M 8/04559* (2013.01); *H01M 8/04753* (2013.01); *H01M 8/04992* (2013.01); *H01M 8/1004* (2013.01); *H01M 2250/20* (2013.01); *Y02T 90/32* (2013.01)

(56) References Cited

U.S. PATENT DOCUMENTS

| | | |
|---|---|---|
| 2015/0030953 A1 | 1/2015 | Asai et al. |
| 2015/0032019 A1 | 1/2015 | Acker et al. |

FOREIGN PATENT DOCUMENTS

| | | |
|---|---|---|
| JP | 2008-016399 A | 1/2008 |
| JP | 2009-123550 A | 6/2009 |
| JP | 2010-251149 A | 11/2010 |
| WO | WO 2013/003429 A1 | 1/2013 |
| WO | WO 2013/129552 A1 | 9/2013 |

\* cited by examiner

FUEL CELL SYSTEM

TECHNICAL FIELD

The present invention relates to a fuel cell system.

BACKGROUND ART

As to the conventional fuel cell system, there is a system provided with a cathode gas supplying system of a cathode gas bypass type wherein a part of an excess cathode gas, which is ejected from a compressor and is not necessary for power generation, is discharged to a cathode gas discharge channel by controlling an opening degree of a bypass valve installed in a bypass channel so as to bypass a fuel cell (refer to JP2009-123550A).

SUMMARY OF INVENTION

In the fuel cell system provided with a cathode gas supplying system of a cathode gas bypass type that is being currently developed, a larger one of a target flow rate of a cathode gas determined from requirement of a fuel cell and a lower limit flow rate of a cathode gas determined from requirement of a fuel cell system is set to a target supply flow rate of a compressor. And in the fuel cell system, the compressor is controlled in such a way that a detected value of a sensor to detect a supply flow rate of the compressor can become the target supply flow rate thereof.

In this way, when the lower limit flow rate is set to the target supply flow rate of the compressor, a cathode gas whose flow rate is more than the target flow rate required from the fuel cell is supplied from the compressor. Accordingly, in order to flow an excess cathode gas unnecessary for the fuel cell to a bypass channel, a supply flow rate of the cathode gas to be supplied to the fuel cell is detected by a sensor which is separately installed in the fuel cell side, and an opening degree of a bypass valve is controlled in such a way that this detected value by the sensor becomes the target flow rate.

Accordingly, if these sensors should become abnormal, the compressor as well as the bypass valve cannot be controlled as intended; and therefore, the abnormality needs to be detected by matching the detected values of these sensors.

However, the sensor to detect the supply flow rate of the compressor and the sensor to detect the supply flow rate of the cathode gas to be supplied to the fuel cell are respectively installed in the compressor side before the bypass in the channel and in the fuel cell side after the bypass in the channel; and therefore, the detected values of these sensors are different under the open state of the bypass valve. Accordingly, under the open state of the bypass valve, these values cannot be matched, so that there has been a problem that the abnormality cannot be detected.

The present invention was made by focusing on the problem as described above; and therefore, an object thereof is to detect, in the fuel cell system provided with the cathode gas supply system of the cathode gas bypass type, the abnormality by matching the sensor to detect the supply flow rate of the compressor with the sensor to detect the supply flow rate of the cathode gas to be supplied to the fuel cell.

According to one aspect of the present invention, the present invention provides a fuel cell system including a cathode gas supply system of a cathode gas bypass type in which a part of a cathode gas ejected from a compressor installed in a cathode gas supply channel bypasses a fuel cell via a bypass channel. The fuel cell system includes a first flow rate sensor which is installed in an upstream of a part connected with the bypass channel in the cathode gas supply channel and detects a cathode gas flow rate to be supplied by the compressor, a second flow rate sensor which is installed in a downstream of a part connected with the bypass channel in the cathode gas supply channel and detects a cathode gas flow rate to be supplied to the fuel cell, a bypass valve which is installed in the bypass channel and controls a cathode gas flow rate flowed in the bypass channel. Further, the fuel cell system detects a mismatch of detected values of the first flow rate sensor and the second flow rate sensor based on the detected values of the both sensors during total shut-off of the bypass valve.

DESCRIPTION OF EMBODIMENTS

Hereinafter, embodiments of the present invention will be explained by referring to the figures.

First Embodiment

In the fuel cell, an electrolyte membrane is sandwiched by an anode electrode (fuel electrode) and a cathode electrode (oxidant electrode) wherein an electric power is generated by supplying an anode gas (fuel gas) which contains hydrogen to the anode electrode and a cathode gas (oxidant gas) which contains oxygen to the cathode electrode. The electrode reactions which take place in the respective electrodes, the anode electrode and the cathode electrode, are shown as follows.

Anode electrode: $2H_2 \rightarrow 4H^+ + 4e^-$ (1)

Cathode electrode: $4H^+ + 4e^- + O_2 \rightarrow 2H_2O$ (2)

By these electrode reactions (1) and (2), the fuel cell generates an electromotive force of about 1 volt.

When the fuel cell is used as the power source of a motor vehicle, the required power is so large that hundreds of fuel cells are stacked in order to be used as a fuel cell stack. And then, a fuel cell system in which the anode gas and the cathode gas are supplied to the fuel cell stack is configured so as to take out the power for driving the vehicle.

Figure 1:
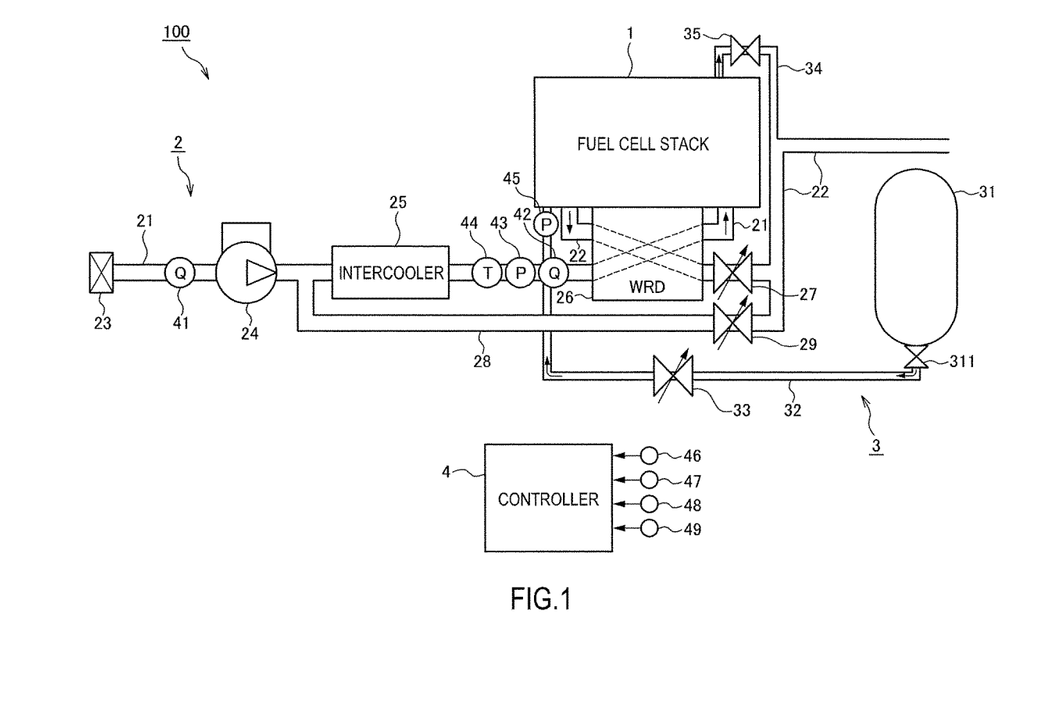
FIG. 1 is a schematic diagram of the fuel cell system according to the first embodiment of the present invention.

FIG. 1 is a schematic diagram of the fuel cell system 100 according to the first embodiment of the present invention.

The fuel cell system 100 includes the fuel cell stack 1 as the fuel cell, the cathode gas supply and discharge device 2, the anode gas supply and discharge device 3, and the controller 4.

The fuel cell stack 1 is formed by stacking hundreds of fuel cells, and generates a power necessary to drive a vehicle by receiving supply of the anode gas and the cathode gas.

The cathode gas supply and discharge device 2 supplies the cathode gas (air) to the fuel cell stack 1 and discharges the cathode off-gas discharged from the fuel cell stack 1 to the outside air. The cathode gas supply and discharge device 2 includes the cathode gas supply channel 21, the cathode gas discharge channel 22, the filter 23, the cathode compressor 24 as the compressor, the intercooler 25, the water recovery device (hereinafter, this device is referred to as "WRD") 26, the cathode pressure control valve 27, the bypass channel 28, the bypass valve 29, the first air flow sensor 41 as the first flow rate sensor, the second air flow sensor 42 as the second flow rate sensor, the cathode pressure sensor 43, and the temperature sensor 44.

The cathode gas supply channel 21 is the channel through which the cathode gas to be supplied to the fuel cell stack 1 flows. The cathode gas supply channel 21 is connected to the filter 23 on its one end and to the cathode gas inlet hole of the fuel cell stack 1 on its other end.

The cathode gas discharge channel 22 is the channel through which the cathode off-gas discharged from the fuel cell stack 1 flows. The cathode gas discharge channel 22 is connected to the cathode gas outlet hole of the fuel cell stack 1 on its one end, and its other end is an open end. The cathode off-gas is a mixed gas including oxygen not used in the electrode reaction, nitrogen contained in the cathode gas, water vapor generated by the electrode reaction, and the like.

The filter 23 removes foreign matters in the cathode gas to be taken into the cathode gas supply channel 21.

The cathode compressor 24 is installed in the cathode gas supply channel 21. The cathode compressor 24 takes an air as the cathode gas into the cathode gas supply channel 21 via the filter 23 so as to supply the air to the fuel cell stack 1.

The intercooler 25 is installed at the downstream of the cathode compressor 24 in the cathode gas supply channel 21. The intercooler 25 cools the cathode gas ejected from the cathode compressor 24.

The WRD 26 is connected to both the cathode gas supply channel 21 and the cathode gas discharge channel 22 in order to recover water present in the cathode off-gas flowing through the cathode gas discharge channel 22 and thereby humidifies with this recovered water the cathode gas flowing through the cathode gas supply channel 21.

The cathode gas pressure control valve 27 is installed in the downstream of the WRD 26 in the cathode gas discharge channel 22. The open/shut-off control of the cathode pressure control valve 27 is executed by the controller 4 so as to control the pressure of the cathode gas to be supplied to the fuel cell stack 1 at a predetermined pressure. Meanwhile, a squeezing means such as an orifice may be installed without installing the cathode pressure control valve 27.

The bypass channel 28 is the channel through which a part of the cathode gas ejected from the cathode compressor 24 can be discharged directly to the cathode gas discharge channel 22 without flowing through the fuel cell stack 1 if necessary. One end of the bypass channel 28 is connected to the cathode gas supply channel 21 between the cathode compressor 24 and the intercooler 25. The other end of the bypass channel 28 is connected to the cathode gas discharge channel 22 at the downstream of the cathode pressure control valve 27.

The bypass valve 29 is installed in the bypass channel 28. The open/shut-off control of the bypass valve 29 is executed by the controller 4 so as to control the flow rate of the cathode gas flowing through the bypass channel 28 (hereinafter, this flow rate is referred to as "the bypass flow rate").

The first air flow sensor 41 is installed in the upstream of the cathode compressor 24 in the cathode gas supply channel 21. The first air flow sensor 41 detects the flow rate of the cathode gas to be supplied to the cathode compressor 24 (hereinafter, this flow rate is referred to as "the compressor supply flow rate"). Hereinafter, this detected value of the first air flow sensor 41 is referred to as "the detected compressor supply flow rate".

The second air flow sensor 42 is installed at the downstream of the part connected with the bypass channel 28 in the cathode gas supply channel 21. The second air flow sensor 42 detects the flow rate of the cathode gas to be supplied to the fuel cell stack 1 in the cathode gases ejected from the cathode compressor 24 (hereinafter, this flow rate is referred to as "the tack supply flow rate"). The stack supply flow rate is the flow rate obtained by subtracting the bypass flow rate from the compressor supply flow rate. Hereinafter, this detected value of the second air flow sensor 42 is referred to as "the detected stack supply flow rate".

The cathode pressure sensor 43 is installed around the cathode gas entering side of the WRD 26 in the cathode gas supply channel 21. The cathode pressure sensor 43 detects the cathode gas pressure around the cathode gas entering side of the WRD 26. Hereinafter, the detected value by the cathode pressure sensor 43 is referred to as "the detected cathode pressure".

The temperature sensor 44 is installed in the cathode gas supply channel 21 between the intercooler 25 and the WRD 26. The temperature sensor 44 detects the temperature of the cathode gas entering side of the WRD (hereinafter, this temperature is referred to as "the WRD inlet temperature").

The anode gas supply and discharge device 3 supplies the anode gas to the fuel cell stack 1 and discharges the anode off-gas discharged from the fuel cell stack 1 to the cathode gas discharge channel 22. The anode gas supply and discharge device 3 includes the high pressure tank 31, the anode gas supply channel 32, the anode pressure control valve 33, the anode gas discharge channel 34, the purge valve 35, and the anode pressure sensor 45.

The high pressure tank 31 stores the anode gas (hydrogen) to be supplied to the fuel cell stack 1 in the state that the pressure of the anode gas is kept high. In the supply port of the high pressure tank 31, the shut-off valve 311 which stops supply of the anode gas e.g. at a time of shut-down of the system is installed.

The anode gas supply channel 32 is a channel through which the anode gas discharged from the high pressure tank 31 is supplied to the fuel cell stack 1. One end of the anode gas supply channel 32 is connected to the supply port of the high pressure tank 31, and the other end of the anode gas supply channel 32 is connected to the anode gas inlet hole of the fuel cell stack 1.

The anode pressure control valve 33 is installed in the anode gas supply channel 32. The open/shut-off control of the anode pressure control valve 34 is executed by the controller 4 in such a way that the pressure of the anode gas to be supplied to the fuel cell stack 1 can be controlled at a predetermined pressure.

The anode gas discharge channel 34 is the channel through which the anode off-gas discharged from the fuel cell stack 1 flows. One end of the anode gas discharge channel 34 is connected to the anode gas outlet hole of the fuel cell stack 1, and the other end of the anode gas discharge channel 34 is connected to the cathode gas discharge channel 22.

The anode off-gas discharged to the cathode gas discharge channel 22 via the anode gas discharge channel 34 is discharged outside of the fuel cell system 100 after the anode off-gas is mixed with the cathode off-gas in the cathode gas discharge channel 22. The anode off-gas contains an excess anode gas not used in the electrode reaction; and therefore, by discharging the anode off-gas outside of the fuel cell system 100 after the anode off-gas is mixed with the cathode off-gas, the hydrogen concentration in the discharged gas is made not higher than the predetermined concentration thereof. The predetermined concentration is set at 4% or less, which is the flammable concentration of hydrogen.

The purge valve 35 is installed in the anode gas discharge channel 34. The open/shut-off control of the purge valve 35 is executed by the controller 4 so as to control the flow rate of the anode off-gas to be discharged to the cathode gas discharge channel 22 from the anode gas discharge channel 34.

The anode pressure sensor 45 is installed at the downstream of the anode pressure control valve 33 in the anode gas supply channel 32 so as to detect the pressure of the anode gas to be supplied to the fuel cell stack 1 (hereinafter, this pressure is referred to as "the anode pressure"). Hereinafter, the detected value of the anode pressure sensor 45 is referred to as "the detected anode pressure".

The controller 4 is configured by a microcomputer including a central calculation unit (CPU), a read only memory (ROM), a random access memory (RAM), and an input/output interface (I/O interface). In this embodiment, the controller 4 functions as a bypass valve controlling unit, a mismatch diagnosing unit, a compressor controlling unit, a target cathode gas flow rate calculating unit, a lower limit flow rate calculating unit, a target humidity calculating unit, and a target humidity correcting unit.

Input into the controller 4 are not only the signals from the first air flow sensor 41 and the like as described above but also the signals from various sensors such as the current sensor 46 to detect the current taken out from the fuel cell stack 1 (output current), the voltage sensor 47 to detect the output voltage of the fuel cell stack 1, the accelerator stroke sensor 48 to detect the stroke amount of the accelerator pedal (hereinafter, this amount is referred to as "the accelerator operation amount"), and the SOC sensor 49 to detect the charged amount of the battery (not shown by the figure).

The controller 4 calculates the target output power based on the required power of a running motor to drive a vehicle (not shown by the figure), the required power of supplemental devices such as the cathode compressor 24, and the required charging and discharging amounts of the battery (not shown by the figure). Then, based on the target output power, the target output current is calculated from previously determined IV characteristics of the fuel cell stack 1.

In addition, the controller 4 executes the feedback control of the cathode compressor 22 and the bypass valve 29 in such a way that the stack requirement and the dilution requirement can be satisfied simultaneously. The stack requirement mentioned here is a requirement that the fuel cell stack 1 is made to generate a power in the optimum state when generating the target output power e.g. by considering securement of the oxygen partial pressure and humidity of the electrolyte membrane. The dilution requirement is a requirement that the hydrogen concentration in the discharged gas to be discharged to outside the fuel cell system 100 is made not more than the predetermined concentration thereof.

That is, a larger one of the compressor supply flow rate necessary to satisfy the stack requirement (hereinafter, this flow rate is referred to as "the stack-requiring compressor supply flow rate") and the compressor supply flow rate necessary to satisfy the dilution requirement (hereinafter, this flow rate is referred to as "the dilution-requiring compressor supply flow rate") is set to the target compressor supply flow rate by the controller 4. The controller 4 then executes the feedback control of the cathode compressor 24 in such a way that the detected compressor supply flow rate can become the target compressor supply flow rate.

When the dilution-requiring compressor supply flow rate is set to the target compressor supply flow rate, the cathode gas whose amount is more than the stack-requiring compressor supply flow rate needs to be supplied by the cathode compressor 24. Accordingly, an excess cathode gas not necessary to generate a power is supplied to the fuel cell stack 1.

Therefore, when the dilution-requiring compressor supply flow rate is set to the target compressor supply flow rate, the controller 4 controls the bypass valve 29 in such a way that the excess cathode gas not necessary to generate a power can flow to the bypass channel 28. Specifically, the controller 4 controls the bypass valve 29 in such a way that the detected stack supply flow rate can become the stack supply flow rate necessary to satisfy the stack requirement (hereinafter, this flow rate is referred to as "the target stack supply flow rate").

As described above, in the embodiment, the cathode compressor 24 is controlled by using the detected value of the first air flow sensor 41 (detected compressor supply flow rate), and the bypass valve 29 is controlled by using the detected value of the second air flow sensor 42 (detected stack supply flow rate).

Therefore, if these sensors 41 and 42 should become abnormal, the cathode compressor 24 and the bypass valve 29 cannot be controlled as intended. Especially, if the first air flow sensor 41 should become abnormal thereby giving a higher detected value than the value under a normal state, the compressor supply flow rate becomes lower than the target compressor supply flow rate. Therefore, if the dilution-requiring compressor supply flow rate is set to the target compressor supply flow rate, there is a risk that the dilution requirement cannot be fully satisfied. Accordingly, the mismatch diagnosis is desired to detect a mismatch of the detected values of these two sensors 41 which are installed in the cathode gas supply channel 21.

However, the first air flow sensor 41 is installed in the upstream of the part connected with the bypass channel 28 in the cathode gas supply channel 21, and the second air flow sensor 42 is installed at the downstream of the part connected with the bypass channel 28 in the cathode gas supply channel 21. Because of this, under the open state of the bypass valve 29, the detected values of these two sensors 41 and 42 are different. Therefore, the detected values of these two sensors 41 and 42 cannot be matched so that the mismatch diagnosis cannot be executed.

Accordingly, in the embodiment, the mismatch diagnosis is executed by matching the detected values of these two sensors 41 and 42 under the shut-off state of the bypass valve 29. The mismatch diagnosis is also executed if necessary by forcibly shutting off the bypass valve 29. In addition, the fuel cell system 100 is controlled in such a way that the dilution requirement can be satisfied even when the mismatch between these two sensors 41 and 42 has occurred. Hereinafter, control of the fuel cell system 100 including this mismatch diagnosis will be explained.

Figure 2:
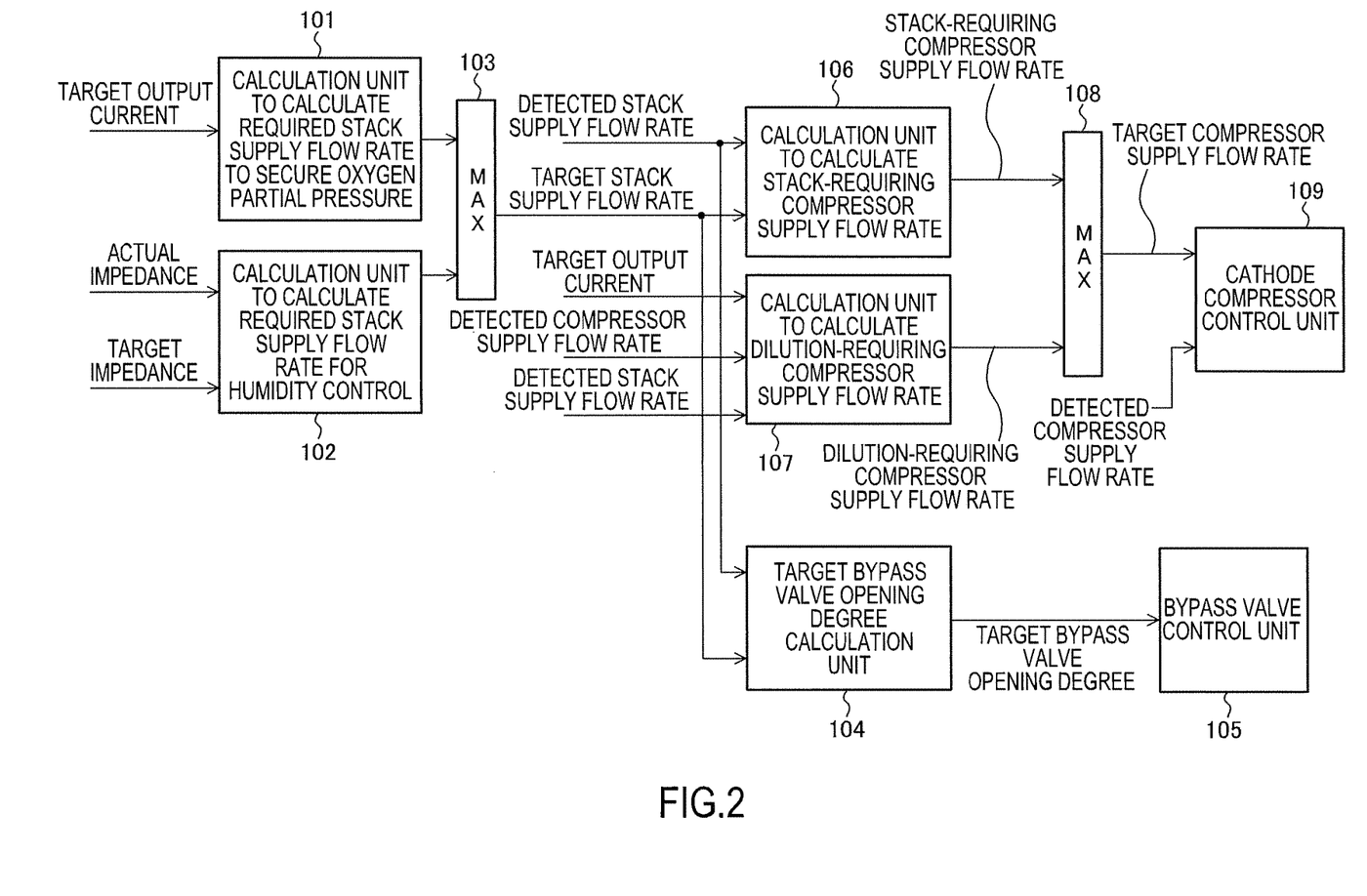
FIG. 2 is a control block diagram of the cathode compressor and the bypass valve according to the first embodiment of the present invention.

FIG. 2 is a control block diagram of the cathode compressor 24 and the bypass valve 29 according to this embodiment.

The target output current is input into the calculation unit 101 to calculate the required stack supply flow rate to secure the oxygen partial pressure. The calculation unit 101 to calculate the required stack supply flow rate to secure the oxygen partial pressure calculates the required stack supply flow rate to secure the oxygen partial pressure based on the target output current. This required stack supply flow rate to secure the oxygen partial pressure is the target value of the stack supply flow rate necessary to secure the oxygen partial pressure necessary for the electrode reaction in the cathode electrode in every fuel cells when the target output current is taken out from the fuel cell stack 1. The required stack supply flow rate to secure the oxygen partial pressure becomes larger when the target output current is larger as compared with a smaller output current.

Input into the calculation unit 102 to calculate the required stack supply flow rate for humidity control are the impedance (HFR) of the fuel cell stack 1 which is calculated, for example, by the alternating impedance method, and the target impedance which is calculated in accordance with the target output current of the fuel cell stack 1. The impedance of the fuel cell stack 1 is correlated with humidity of the electrolyte membrane, wherein the electrolyte membrane becomes the state of higher humidity (water content) as the impedance is smaller. Based on a deviation between the impedance and the target impedance, the calculation unit 102 to calculate the required stack supply flow rate for humidity control calculates, as the required stack supply flow rate for humidity control, the target value of the stack supply flow rate to make the impedance to the target impedance. In other words, this required stack supply flow rate for humidity control is the stack supply flow rate necessary to control the humidity (water content) of the electrolyte membrane so as to be optimum in accordance with the target output current of the fuel cell stack 1.

Input into the target stack supply flow rate setting unit 103 are the required stack supply flow rate to secure the oxygen partial pressure and the required stack supply flow rate for humidity control. Of these two flow rates, the target stack supply flow rate setting unit 103 sets a larger flow rate to the target stack supply flow rate.

Input into the target bypass valve opening degree calculation unit 104 are the detected stack supply flow rate and the target stack supply flow rate. The target bypass valve opening degree calculation unit 104 calculates the target bypass valve opening degree based on these input values. Details of the target bypass valve opening degree calculation unit 104 will be discussed later by referring to the flow charts of FIG. 3 and FIG. 4.

Input into the bypass valve control unit 105 is the target bypass valve opening degree. The bypass valve control unit 105 controls the opening degree of the bypass valve 29 at the target bypass valve opening degree.

Input into the calculation unit 106 to calculate the stack-requiring compressor supply flow rate are the detected stack supply flow rate and the target stack supply flow rate. Based on a deviation between the detected stack supply flow rate and the target stack supply flow rate, the calculation unit 106 to calculate the stack-requiring compressor supply flow rate calculates, as the stack-requiring compressor supply flow rate, the target value of the compressor supply flow rate to make the detected stack supply flow rate to the target stack supply flow rate. This stack-requiring compressor supply flow rate is the compressor supply flow rate necessary to satisfy the requirements of the fuel cell stack 1 such as the requirement to secure the oxygen partial pressure and the requirement for the humidity control.

Input into the calculation unit 107 to calculate the dilution-requiring compressor supply flow rate are the target output current, the detected compressor supply flow rate, and the detected stack supply flow rate. The calculation unit 107 to calculate the dilution-requiring compressor supply flow rate calculates the dilution-requiring compressor supply flow rate based on these input values. This dilution-requiring compressor supply flow rate is not required by the fuel cell stack 1, but it is the compressor supply flow rate necessary to satisfy the requirement of the fuel cell system 100, that is, the requirement to make the hydrogen concentration in the discharged gas not more than the predetermined concentration. Details of the calculation unit 107 to calculate the dilution-requiring compressor supply flow rate will be discussed later by referring to the flow chart of FIG. 5.

Input into the target compressor supply flow rate setting unit 108 are the stack-requiring compressor supply flow rate and the dilution-requiring compressor supply flow rate. Of these two input values, the target compressor supply flow rate setting unit 108 sets a larger one of them to the target compressor supply flow rate.

Input into the cathode compressor control unit 109 are the compressor supply flow rate and the target compressor supply flow rate. Based on a deviation between the compressor supply flow rate and the target compressor supply flow rate, the cathode compressor control unit 109 calculates the torque direction value to the cathode compressor 24, thereby controlling the cathode compressor 24 in accordance with this torque direction value.

Figure 3:
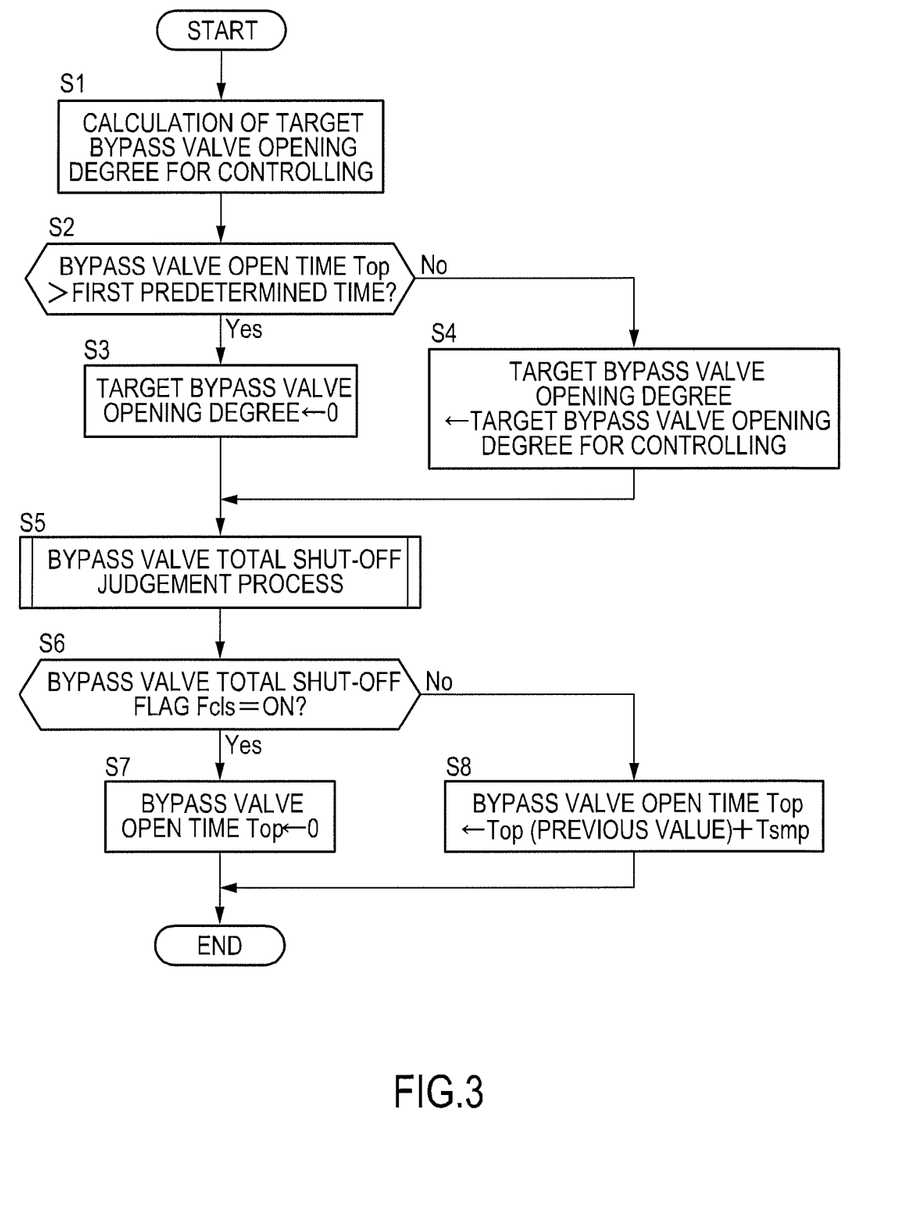
FIG. 3 is a flow chart to explain details of the target bypass valve opening degree calculation unit.

FIG. 3 is a flow chart to explain details of the target bypass valve opening degree calculation unit 104.

In the step S1, based on the deviation between the detected stack supply flow rate and the target stack supply flow rate, the controller 4 calculates, as the target bypass valve opening degree for controlling, the opening degree of the bypass valve 29 so as to make the detected stack supply flow rate to the target stack supply flow rate.

Meanwhile, when the target compressor supply flow rate calculation unit 108 calculates the stack-requiring compressor supply flow rate as the target compressor supply flow rate, the detected stack supply flow rate and the target stack supply flow rate are coincide with each other under the total shut-off state of the bypass valve 29 so that the target bypass valve opening degree for controlling becomes zero (total shut-off).

On the other hand, when the target compressor supply flow rate calculation unit 108 calculates the dilution-requiring compressor supply flow rate as the target compressor supply flow rate, the cathode gas whose flow rate is more than the stack-requiring compressor supply flow rate needs to be supplied by the cathode compressor 24. Because of this, there is no coincidence between the detected stack supply flow rate and the target stack supply flow rate under the total shut-off state of the bypass valve 29, so that the target bypass valve opening degree for controlling becomes a larger value than zero. With this, the bypass valve 29 is opened so that the flow amount unnecessary for the fuel cell stack 1 is flowed out to the bypass channel 28 (unnecessary flow amount=dilution-requiring compressor supply flow rate−stack-requiring compressor supply flow rate).

In this way, the target bypass valve opening degree for controlling can take any value from zero to total opening in accordance with the deviation between the detected stack supply flow rate and the target stack supply flow rate.

In the step S2, the controller 4 judges whether the open state of the bypass valve 29 continues in the first predetermined time. Specifically, the controller 4 judges whether the bypass valve open time Top becomes more than the first predetermined time. If the bypass valve open time Top is more than the first predetermined time, the controller 4 executes the process of the step S3. If the bypass valve open time Top is not more than the first predetermined time, the process of the step S4 is executed.

In the step S3, the controller 4 forcibly and totally shuts off the bypass valve 29; and in order to match the detected values of the first air flow sensor 41 and the second air flow sensor 42, the target bypass valve opening degree is made to zero (total shut-off).

In the step S4, the controller 4 judges that matching of the detected values of the first air flow sensor 41 and the second air flow sensor 42 need not be carried out yet, and therefore the target bypass valve opening degree is made to the target bypass valve opening degree for controlling.

In the step S5, the controller 4 executes the bypass valve total shut-off judgment process. The bypass valve total shut-off judgment process is the process to judge if the bypass valve 29 is in the totally shut-off state by taking into consideration the control delay of the bypass valve 29. Details of the bypass valve total shut-off judgment process will be discussed later by referring to the flow chart of FIG. 4.

In the step S6, the controller 4 judges whether the bypass valve total shut-off flag Fcls is set to ON. The bypass valve total shut-off flag Fcls is the flag which is set to ON when the bypass valve 29 is judged to be completely in the total shut-off state. The controller 4 executes the process of the step S7 if the bypass valve total shut-off flag Fcls is set to ON and the process of the step S8 if this flag is set to OFF.

In the step S7, the controller 4 sets the bypass valve open time Top to zero.

In the step S8, the controller 4 sets the value obtained by adding the previous value of the bypass valve open time Top and the calculation cycle Tsmp of the controller 4 to the bypass valve open time Top.

Figure 4:
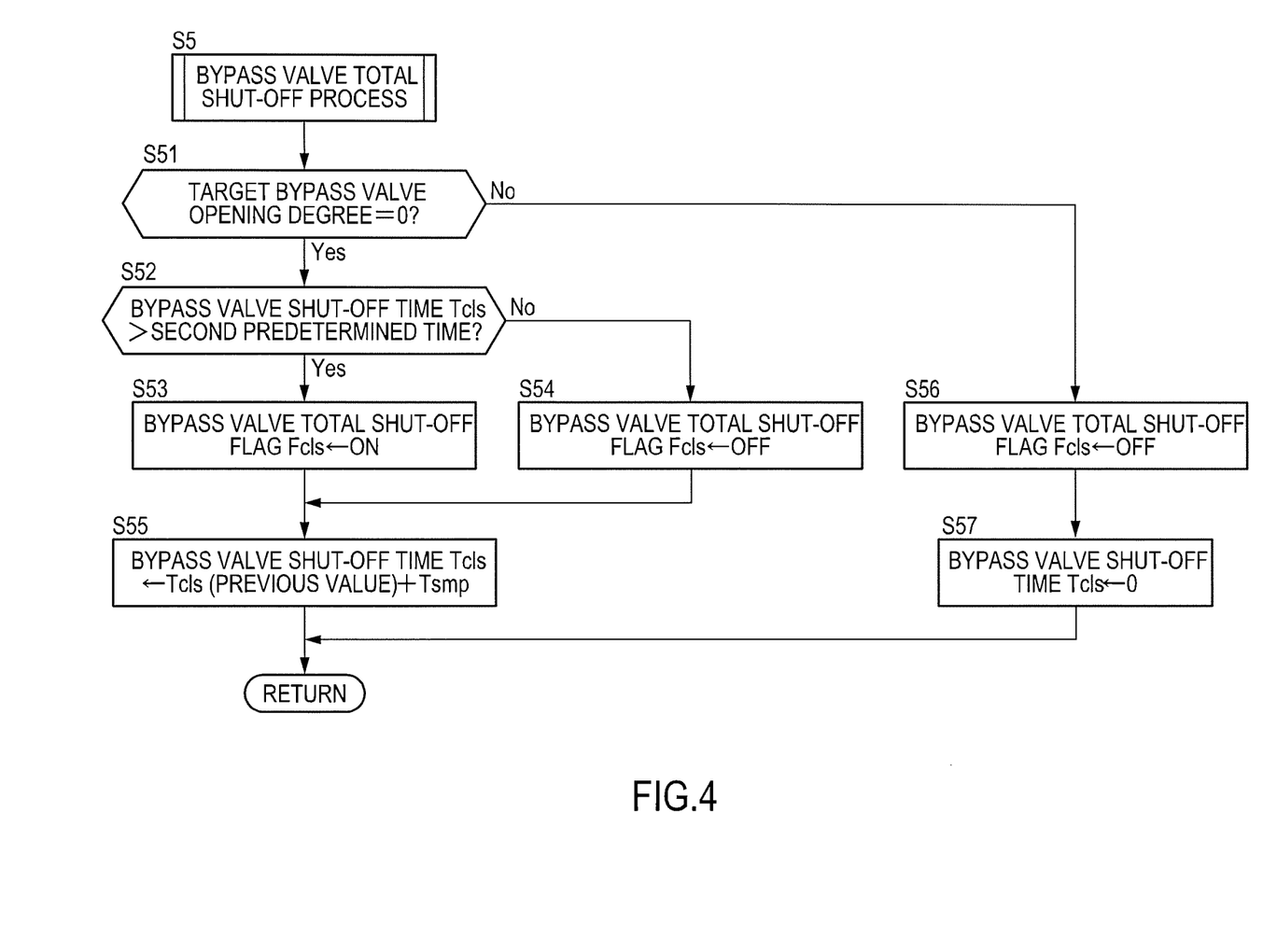
FIG. 4 is a flow chart to explain content of the bypass valve total shut-off judgment process.

FIG. 4 is a flow chart to explain content of the bypass valve total shut-off judgment process.

In the step S51, the controller 4 judges whether the target bypass valve opening degree is zero. The controller 4 executes the process of the step S52 if the target bypass valve opening degree is zero and the process of the step S56 if this is not the case.

In the step S52, the controller 4 judges whether the bypass valve shut-off time Tcls is more than the second predetermined time. The second predetermined time is the predetermined value which is set by taking into consideration the response delay of the bypass valve 29. The controller 4 executes the process of the step S53 if the bypass valve shut-off time Tcls is more than the second predetermined time and the process of the step S54 if it is not more than the second predetermined time.

In the step S53, the controller 4 sets the bypass valve total shut-off flag Fcls to ON. After the target bypass valve opening degree is set to zero and the second predetermined time is passed thereafter, by setting the bypass valve total shut-off flag Fcls to ON in the way as described above, execution of the mismatch diagnosis before the bypass valve 29 becomes completely to the total shut-off state is avoided.

In the step S54, the controller 4 sets the bypass valve total shut-off flag Fcls to OFF.

In the step S55, the controller 4 sets the value obtained by adding the previous value of the bypass valve shut-off time Tcls and the calculation cycle Tsmp to the bypass valve shut-off time Tcls.

In the step S56, the controller 4 sets the bypass valve total shut-off flag Fcls to OFF.

In the step S57, the controller 4 turns the bypass valve shut-off time Tcls back to zero.

Figure 5:
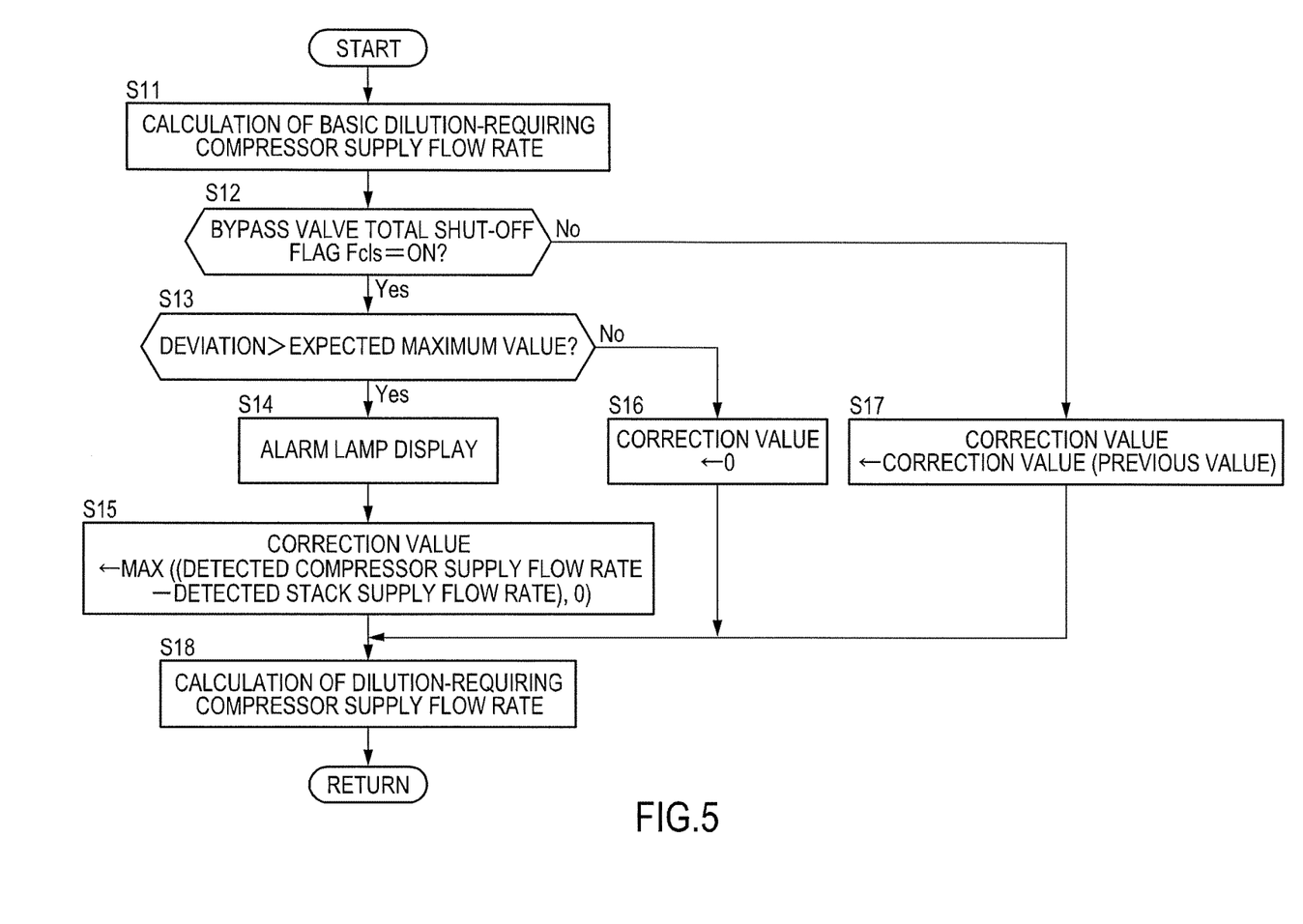
FIG. 5 is a flow chart to explain details of the calculation unit to calculate the dilution-requiring compressor supply flow rate.

FIG. 5 is a flow chart to explain details of the calculation unit 107 to calculate the dilution-requiring compressor supply flow rate.

In the step S11, based on the target output current, the controller 4 calculates the basic dilution-requiring compressor supply flow rate. The basic dilution-requiring compressor supply flow rate is the compressor supply flow rate necessary to make the hydrogen concentration in the discharged gas to be discharged to outside the fuel cell system 100 to not more than the predetermined concentration thereof. In this embodiment, the basic dilution-requiring compressor supply flow rate is made larger when the target output current is larger as compared with the smaller target output current; however, this supply flow rate may be constant regardless of the target output current.

In the step S12, the controller 4 reads in the bypass valve total shut-off flag Fcls; and the controller executes the process of the step S13 if the bypass valve total shut-off flag Fcls is ON and the process of the step S17 if this flag is OFF.

In the step S13, the controller 4 executes the mismatch diagnosis of the detected values of the first air flow sensor 41 and the second air flow sensor 42. Specifically, the controller 4 judges whether the absolute value of the deviation of the true values obtained by subtracting a predetermined error from each of the detected values of the first air flow sensor 41 and the second air flow sensor 42 becomes larger than the maximum value of the deviation of the previously expected true values (hereinafter, this value is referred to as "the expected maximum value"). The controller 4 executes the process of the step S14 if the absolute value of the deviation of the true values is more than the expected maximum value and the process of the step S16 if this absolute value is not more than the expected maximum value.

In the step S14, the controller 4 executes the alarm lamp display to indicate that the detected values of the first air flow sensor 41 and the second air flow sensor 42 are mismatched more than expected.

In the step S15, the controller 4 calculates the correction value of the basic dilution-requiring compressor supply flow rate. Specifically, the controller 4 calculates, as the correction value, a larger value between zero and the value obtained by subtracting the detected value of the second air flow sensor 42 (detected stack supply flow rate) from the detected value of the first air flow sensor 41 (detected compressor supply flow rate), as shown by the following equation (3).

$$\text{Correction value} = \text{MAX}((\text{detected compressor supply flow rate} - \text{detected stack supply flow rate}), 0) \quad (3)$$

In the step S16, the controller 4 turns the correction value back to zero.

In the step S17, the controller 4 sets the previous value of the correction value, as it is, to the current correction value.

In the step S18, the controller 4 calculates the dilution-requiring compressor supply flow rate by adding the correction value to the basic dilution-requiring compressor supply flow rate.

Hereinafter, explanation will be made regarding the reason why the value obtained by adding the correction value to the basic dilution-requiring compressor supply flow rate is made to the dilution-requiring compressor supply flow rate as describe above.

If the detected stack supply flow rate is a larger value than the detected stack supply flow rate in spite that the bypass valve 29 is totally shut-off, then there is a possibility that any one of the first air flow sensor 41 and the second air flow sensor 42 becomes abnormal.

At this time, by assuming that the detected value of the first air flow sensor 41 (detected compressor supply flow rate) is correct, for example, if the basic dilution-requiring compressor supply flow rate is set to the target compressor supply flow rate whereby executing the feedback control of the cathode compressor 24 in such a way that the detected compressor supply flow rate can become the basic dilution-requiring compressor supply flow rate, then the problem as shown below would emerge.

Namely, if the detected value of the second air flow sensor 42 (detected stack supply flow rate) is a correct value, it means that the detected value of the first air flow sensor 41 (detected compressor supply flow rate) is a higher value than the actual value. Then, if the cathode compressor is controlled in such a way that the detected compressor supply flow rate can become the basic dilution-requiring compressor supply flow rate, the actual compressor supply flow rate becomes smaller than the basic dilution-requiring compressor supply flow rate, thereby leading to an unsatisfactory result in the dilution requirement.

Accordingly, in the embodiment, by assuming that the detected value of the second air flow sensor 42 (detected stack supply flow rate) is correct, if the detected compressor supply flow rate is a larger value than the detected stack supply flow rate, the value obtained by adding the deviation value as the correction value to the basic dilution-requiring compressor supply flow rate is made to the dilution-requiring compressor supply flow rate.

Therefore, even if the detected value of the first air flow sensor 41 (detected compressor supply flow rate) is a higher value than the actual value, the value obtained by adding this incremental value as the correction value becomes the dilution-requiring compressor supply flow rate; and therefore, if the cathode compressor 24 is controlled by the feedback control in such a way that the detected compressor supply flow rate can become the dilution-requiring compressor supply flow rate, the dilution requirement can be satisfied.

In addition, even if the detected value of the first air flow sensor 41 (detected compressor supply flow rate) should be the correct value, the dilution requirement can be satisfied by feedback-controlling the cathode compressor 24 so that the detected compressor supply flow rate can become the dilution-requiring compressor supply flow rate because the compressor supply flow rate becomes more than the basic dilution-requiring compressor supply flow rate without fail.

Next, by referring to FIG. 6, explanation will be made as to the fail-safe control which is executed in parallel to the above control. This fail control is the control to stop supplying of the anode gas if the dilution air is diagnosed insufficient by the diagnosis with regard to whether the dilution air is insufficient.

Figure 6:
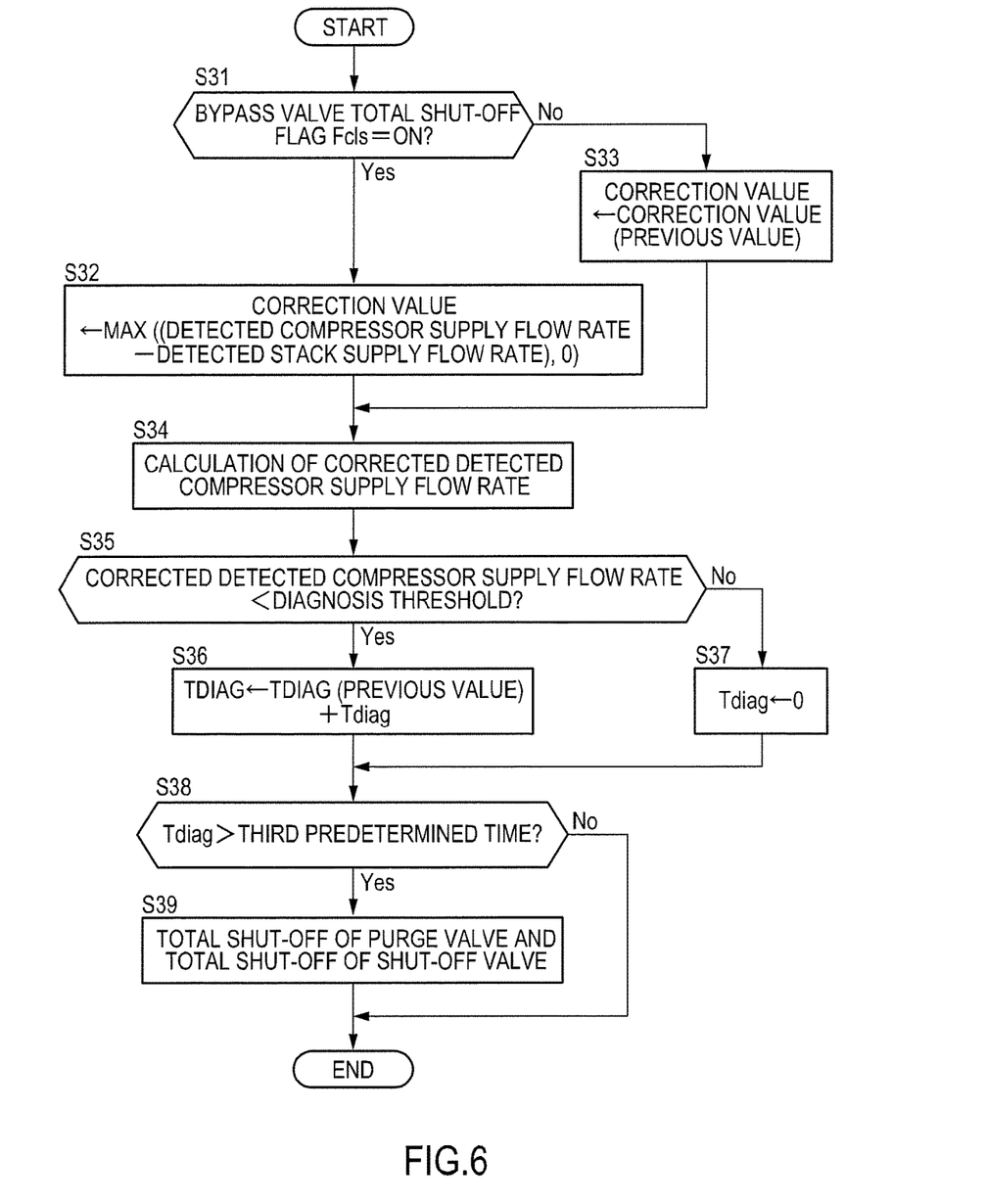
FIG. 6 is a flow chart to explain the fail-safe control.

FIG. 6 is a flow chart to explain the fail-safe control.

In the step S31, the controller 4 reads in the bypass valve total shut-off flag Fcls; and then, the controller executes the process of the step S32 if the bypass valve total shut-off flag Fcls is ON and the process of the step S33 if this flag is OFF.

In the step S32, the controller 4 calculates the correction value of the detected value of the first air flow sensor 41 (detected compressor supply flow rate). Specifically, based on the equation (3) described above, the controller 4 calculates, as the correction value, a larger one of zero and the value obtained by subtracting the detected value of the second air flow sensor 42 (detected stack supply flow rate) from the detected value of the first air flow sensor 41 (detected compressor supply flow rate).

In the step S33, the controller 4 makes the previous value of the correction value, as it is, to the current correction value.

In the step S34, the controller 4 calculates, as the corrected detected compressor supply flow rate, the value obtained by subtracting the correction value from the detected value of the first air flow sensor 41 (detected compressor supply flow rate).

In the step S35, the controller 4 judges whether the corrected detected compressor supply flow rate is smaller than the predetermined diagnosis threshold. The diagnosis threshold is set at the value at which the hydrogen concentration in the discharged gas becomes the predetermined concentration or higher than the flammable concentration thereof when the compressor supply flow rate becomes lower than this diagnosis threshold. As the diagnosis threshold, for example, the basic dilution-requiring compressor supply flow rate may be used. The controller 4 executes the process of the step S36 if the corrected detected compressor supply flow rate is less than the diagnosis threshold and the process of the step S37 if the supply flow rate is not less than the diagnosis threshold.

In the step S36, the controller 4 makes the value obtained by adding the previous value of the diluting air insufficiency diagnosis time Tdiag with the calculation cycle Tsmp to the diluting air insufficiency diagnosis time Tdiag.

In the step S37, the controller 4 turns the diluting air insufficiency diagnosis time Tdiag back to zero.

In the step S38, the controller 4 executes the process of the step S39 if the diluting air insufficiency diagnosis time Tdiag is more than the third predetermined time, and this process is terminated if it is not the case.

In the step S39, the controller 4 judges that sufficient amount of the cathode gas is not supplied to satisfy the dilution requirement (insufficient amount of the dilution air); and then, the shut-off valve 311 and the purge valve 34 are totally shut-off as the fail-safe.

The fuel cell system 100 according to this embodiment as explained above is provided with the cathode gas supply system of the cathode gas bypass type in which a part of the cathode gas ejected from the cathode compressor 24 installed in the cathode gas supply channel 21 is not supplied to the fuel cell stack 1 but it can bypass the fuel cell stack 1 via the bypass channel 28.

In the fuel cell system 100 as described above, the flow rate of the cathode gas supplied by the cathode compressor 24 is detected by the first air flow sensor 41 which is installed in the upstream of the part connected with the bypass channel 28 in the cathode gas supply channel 21. Also, the flow rate of the cathode gas supplied to the fuel cell stack 1 is detected by the second air flow sensor 42 which is installed in the downstream of the part connected with the bypass channel 28 in the cathode gas supply channel 21. And in addition, the flow rate of the cathode gas flowing in the bypass channel 28 is controlled by the bypass valve 29 which is installed in the bypass channel 28.

Moreover, in the fuel cell system 100 configured as described above, the controller 4 executes the open/shut-off regulation of the bypass valve 29 in accordance with the operation state of the fuel cell system 100, and based on the detected values of the first air flow sensor 41 and the second air flow sensor 42 when the bypass valve 29 is totally shut-off, the controller is made to detect the mismatch of these sensors 41 and 42.

According to this configuration, the detected values of the first air flow sensor 41 and the second air flow sensor 42 each becomes almost the same when the bypass valve 29 is totally shut-off; and therefore, as shown in the embodiment, by matching the detected values of these sensors 41 and 42, abnormality of these sensors 41 and 42 can be detected.

In addition, when the open time of the bypass valve 29 becomes more than the first predetermined time, by the controller 4 of the fuel cell system 100 according to the embodiment, the bypass valve 29 is forcibly and totally shut-off, so that the mismatch diagnosis of the first air flow sensor 41 and the second air flow sensor 42 can be executed.

In this way, the execution frequency of the mismatch diagnosis of the first air flow sensor 41 and the second air flow sensor 42 can be secured, so that the reliability of the fuel cell system 100 can be secured.

In addition, the controller 4 of the fuel cell system 100 according to this embodiment controls the cathode compressor 24 in such a way that the stack requirement and the dilution requirement can be satisfied simultaneously. At this time, by further taking the result of the mismatch diagnosis into consideration, the cathode compressor 24 is controlled.

Specifically, the controller 4 sets the larger one of the stack-requiring compressor supply flow rate and the dilution-requiring compressor supply flow rate to the target compressor supply flow rate, and controls the cathode compressor 24 based on the target compressor supply flow rate and the detected value of the first air flow sensor 41 (detected compressor supply flow rate). And then, if the mismatch that the detected value of the first air flow sensor 41 becomes larger than the detected value of the second air flow sensor 42 occurred, based on the deviation of the detected values of both the sensors 41 and 42, the dilution-requiring compressor supply flow rate is corrected so as to be increased.

In this way, even if the detected value of the first air flow sensor 41 (detected compressor supply flow rate) should be a higher value than the actual value, because the incremental value (deviated value) is added as the correction value to make it the dilution-requiring compressor supply flow rate, the dilution requirement can be satisfied if the cathode compressor 24 is controlled by the feedback control in such a way that the detected compressor supply flow rate can become the dilution-requiring compressor supply flow rate.

In addition, even if the detected value of the first air flow sensor 41 (detected compressor supply flow rate) should be the correct value, if the cathode compressor 24 is controlled by the feedback control in such a way that the detected compressor supply flow rate can become the dilution-requiring compressor supply flow rate, because the compressor supply flow rate is more than the compressor supply flow rate necessary for dilution (basic dilution-requiring compressor supply flow rate) without fail, the dilution requirement can be satisfied.

Meanwhile, in the case that when a mismatch occurs between the detected values of the first air flow sensor 41 and the second air flow sensor 42, the cathode compressor 24 is controlled by assuming that the second air flow sensor 42 shows the correct value, in addition to correcting the dilution-requiring compressor supply flow rate, i.e., the target value of the compressor supply flow rate in the way as described above, a measure such as, for example, the following measure may be taken.

That is, when a mismatch occurs between the detected values of the first air flow sensor 41 and the second air flow sensor 42, the controller 4 may control the compressor based on the detected value of the second air flow sensor 42 (detected stack supply flow rate) and the target compressor supply flow rate in place of the detected value of the first air flow sensor 41.

However, if the sensor used to control the cathode compressor 24 is switched over during the control, there is a risk that the control becomes unstable at the time of the switchover. Therefore, by correcting the target value of the compressor supply flow rate in the way as shown in the embodiment, the dilution requirement can be satisfied without causing the unstable control even if a mismatch occurs between the detected values of both the sensors 41 and 42.

Second Embodiment

Next, the second embodiment of the present invention will be explained. This embodiment is different from the first embodiment in that humidity of the electrolyte membrane is previously raised before the bypass valve 29 is forcibly and totally shut-off. Hereinafter, explanation will be made focusing on this difference. Meanwhile, in all embodiments shown below, duplicate explanation of the parts showing the same functions as the first embodiment is arbitrarily omitted by using the same symbols.

In the first embodiment, when the open time of the bypass valve 29 becomes more than the first predetermined time, the bypass valve 29 is forcibly and totally shut-off to secure frequency of the mismatch diagnosis.

However, during the time when the bypass valve 29 is open, it is in the state that the flow amount unnecessary for the fuel cell stack 1 (this amount=dilution-requiring compressor supply flow rate−stack-requiring compressor supply flow rate) is flowed to the bypass channel 28. In other words, it is in the state that the cathode compressor 24 supplies the cathode gas whose amount is more than the stack requirement.

Because of this, if the bypass valve 29 is forcibly shut-off, the cathode gas whose amount is more than the stack requirement is supplied to the fuel cell stack 1. Then, the electrolyte membrane becomes dry, which may cause decrease in the power generation efficiency of the fuel cell stack 1.

Figure 7:
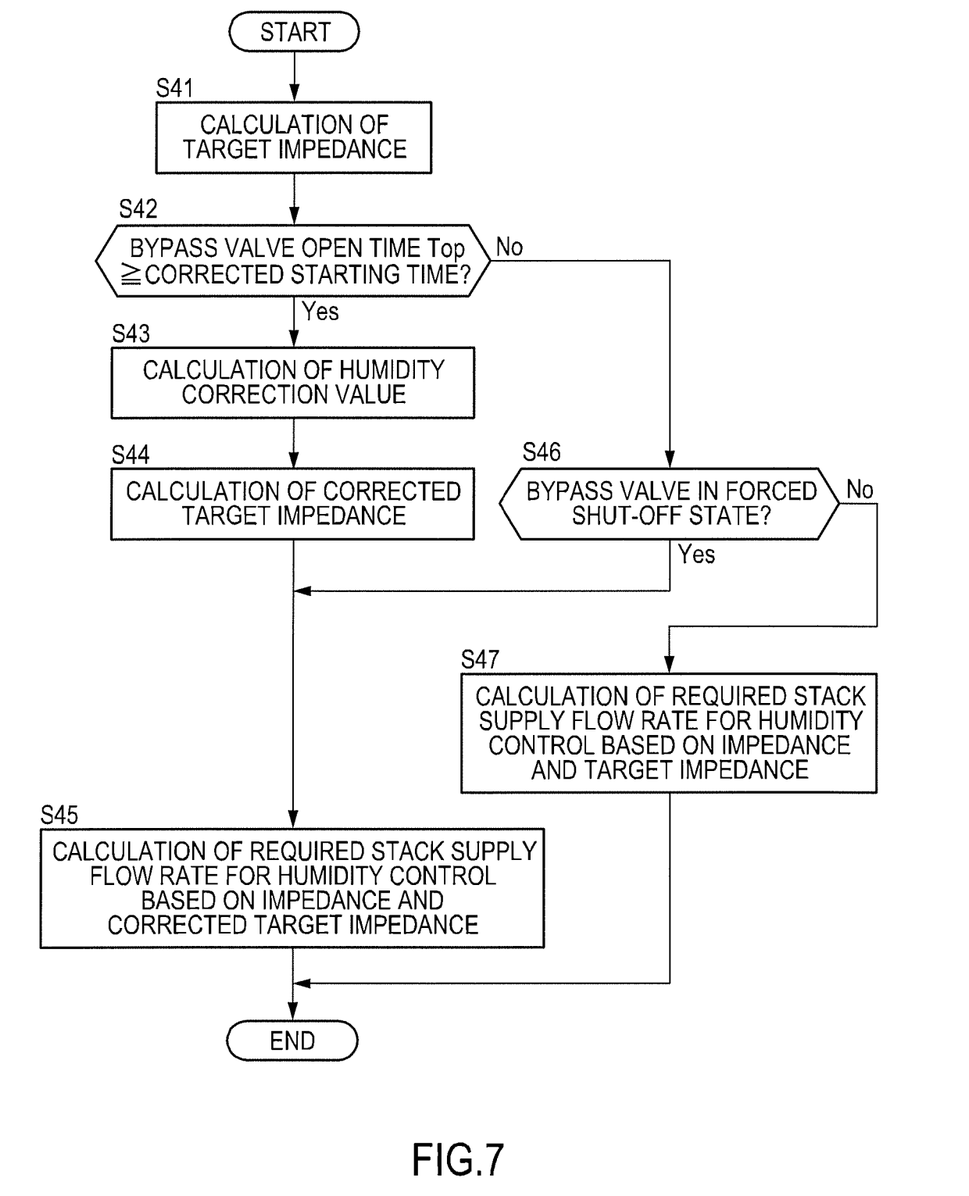
FIG. 7 is a flow chart to explain details of the calculation unit to calculate the required stack supply flow rate for humidity control according to this embodiment.

Therefore, in the embodiment, if the open time of the bypass valve 29 becomes more than the corrected starting time which is shorter than the first predetermined time, the target impedance which is calculated based on the target output current of the fuel cell stack 1 is corrected so as to previously make humidity of the electrolyte membrane higher than the usual time.

FIG. 7 is a flow chart to explain details of the calculation unit 102 to calculate the required stack supply flow rate for humidity control according to this embodiment.

In the step S41, the controller 4 calculates the target impedance based on the target output current of the fuel cell stack 1.

In the step S42, the controller 4 judges whether the bypass valve open time Top becomes equal to or more than the predetermined corrected starting time. The corrected starting time is set to a shorter time than the first predetermined time, and it is previously determined by an experiment or the like by taking a transient response characteristic in the humidity change of the electrolyte membrane into consideration. The controller 4 executes the process of the step S43 if the bypass valve open time Top is not less than the corrected starting time and the process of the step S46 if it is less than the corrected starting time.

In the step S43, the controller 4 calculates the humidity correction value based on the current bypass valve opening degree. The humidity correction value becomes larger when the bypass valve opening degree becomes larger as compared with a smaller opening degree thereof. Meanwhile, the humidity correction value may be calculated based on the current bypass flow rate (=detected compressor supply flow rate−detected stack supply flow rate). In this case, too, the humidity correction value becomes larger when the bypass flow rate becomes larger as compared with a smaller flow rate thereof.

In the step S44, the controller 4 calculates, as the corrected target impedance, the value obtained by subtracting the humidity correction value from the target impedance. This is because humidity of the electrolyte membrane becomes higher when the target impedance is made smaller.

In the step S45, based on the deviation between the impedance and the corrected target impedance, the controller 4 calculates, as the required stack supply flow rate for humidity control, the target value of the stack supply flow rate thereby making the impedance to the corrected target impedance.

In the step S46, the controller 4 judges whether the bypass valve 29 is in the state of forced shut-off. The controller 4 executes the process of the step S45 if the bypass valve 29 is in the state of forced shut-off and the process of the step S47 if it is not the case.

In the step S47, based on the deviation between the impedance and the target impedance, the controller 4 calculates, as the required stack supply flow rate for humidity control, the target value of the stack supply flow rate thereby making the impedance to the target impedance.

The controller 4 of the fuel cell system 100 according to the embodiment as explained above calculates the target impedance (target humidity of the electrolyte membrane) of the fuel cell stack 1 based on the target output current (load) of the fuel cell stack 1. Then, if the open time of the bypass valve 29 becomes more than the corrected starting time (second predetermined period) which is shorter than the first predetermined time, the controller 4 corrects the target impedance in such a way that humidity of the electrolyte membrane can be increased.

In this way, even when the bypass valve 29 is forcibly shut-off to execute the mismatch diagnosis, the electrolyte membrane can be kept in the optimum humidity state. Accordingly, decrease in the power generation efficiency of the fuel cell stack 1 can be suppressed.

In the above, embodiments of the present invention have been explained; however, the embodiments described above show only a part of applications of the present invention, and thus, the embodiments does not intend to limit the technical scope of the present invention to the specific configurations of the above-described embodiments.

As described above, if the bypass valve 29 is forcibly shut-off, the cathode gas whose amount is more than the stack requirement is supplied to the fuel cell stack 1 thereby temporarily leading to increase in the pressure of the cathode side inside the fuel cell stack 1. The electrolyte membrane receives the pressure from both the anode side and the cathode side inside the fuel cell stack 1. Therefore, when the pressure difference between the anode side and the cathode side via the electrolyte membrane (hereinafter, this pressure difference is referred to as "the transmembrane pressure difference") becomes larger or changes suddenly, an unexpected shear stress is applied to the electrolyte membrane thereby causing deterioration of the fuel cell.

Accordingly, for example, when the bypass valve 29 is forcibly and totally shut-off, based on the bypass valve opening degree or the bypass flow rate before total shut-off of the bypass valve 29, the opening degree of the cathode pressure control valve 27 may be made larger than the opening degree before the total shut-off of the bypass valve 29. By so doing, the pressure change in the cathode side inside the fuel cell stack 1 can be suppressed; and thus, deterioration of the fuel cell due to application of the unexpected shear stress to the electrolyte membrane can be suppressed.

Also, in each of the embodiments described above, the requirement to secure the oxygen partial pressure and the requirement for the humidity control are shown as examples of the requirements of the fuel cell stack 1; however, the requirements are not limited to them. For example, the upper limit value of the stack supply flow rate based on the protection requirement of the pressure resistance of the fuel cell stack 1 may be input into the target stack supply flow rate setting unit 103.

Also, the dilution requirement is shown as the example of the requirement of the fuel cell system 100; however, the requirement is not limited to this. For example, as the protection requirement of the compressor, the lower limit value of the compressor supply flow rate to avoid generation of the surge by the cathode compressor 24 may be input into the target compressor supply flow rate setting unit 108.

The present application claims a priority of Japanese Patent Application No. 2013-211319 filed with the Japan Patent Office on Oct. 8, 2013, and all the contents of which are hereby incorporated by reference.

The invention claimed is:

1. A fuel cell system comprising a cathode gas supply system of a cathode gas bypass type in which a part of a cathode gas ejected from a compressor installed in a cathode gas supply channel bypasses a fuel cell via a bypass channel, wherein the fuel cell system comprises:
    a first flow rate sensor which is installed in an upstream of a part connected with the bypass channel in the cathode gas supply channel and detects a cathode gas flow rate to be supplied to the compressor;
    a second flow rate sensor which is installed in a downstream of a part connected with the bypass channel in the cathode gas supply channel and detects a cathode gas flow rate to be supplied to the fuel cell;
    a bypass valve which is installed in the bypass channel and controls a cathode gas flow rate flowed in the bypass channel; and
    a controller programmed to
    execute an open/shut-off control of the bypass valve in accordance with an operation state of the fuel cell system, and
    detect a mismatch of detected values of the first flow rate sensor and the second flow rate sensor based on the detected values of the both sensors during total shut-off of the bypass valve.

2. The fuel cell system according to claim 1, wherein the controller is further programmed to:
    control the compressor based on a requirement of the fuel cell; and
    increase a cathode gas flow rate supplied by the compressor when a mismatch that a detected value of the first flow rate sensor becomes larger than a detected value of the second flow rate sensor occurs.

3. The fuel cell system according to claim 1, wherein the controller is further programmed to:
  control the compressor in such a way that a requirement of the fuel cell and a requirement of the fuel cell system can be satisfied simultaneously; and
  control the compressor by further taking a diagnosis result of the controller into consideration.

4. The fuel cell system according to claim 2, wherein the controller is further programmed to
  calculate, based on the requirement of the fuel cell, a target cathode gas flow rate to be supplied to the fuel cell;
  calculate, based on a requirement of the fuel cell system, a lower limit flow rate of a cathode gas supplied by the compressor; and
  set a larger one of the target cathode gas flow rate and the lower limit flow rate to a target supply flow rate of the compressor, and control the compressor based on the target supply flow rate and the detected value of the first flow rate sensor, and
  when the mismatch that the detected value of the first flow rate sensor becomes larger than the detected value of the second flow rate sensor occurs, the lower limit flow rate is corrected so as to be increased based on a deviation of the detected values of the both sensors.

5. The fuel cell system according to claim 2, wherein the controller is further programmed to:
  calculate, based on the requirement of the fuel cell, a target cathode gas flow rate to be supplied to the fuel cell;
  calculate, based on a requirement of the fuel cell system, a lower limit flow rate of a cathode gas supplied by the compressor; and
  set a larger one of the target cathode gas flow rate and the lower limit flow rate to a target supply flow rate of the compressor, and control the compressor based on this target supply flow rate and a detected value of the first flow rate sensor, and
  when a mismatch that the detected value of the first flow rate sensor becomes larger than a detected value of the second flow rate sensor occurs, the compressor is controlled based on a detected value of the second flow rate sensor and the target supply flow rate in place of the detected value of the first flow rate sensor.

6. The fuel cell system according to claim 1, wherein the controller is further programmed to detect the mismatch of the detected values of the both sensors by forcibly and totally shutting the bypass valve off when an open time of the bypass valve becomes more than a first predetermined time.

7. The fuel cell system according to claim 6, wherein the controller is further programmed to:
  calculate, based on a load of the fuel cell, a target humidity of an electrolyte membrane of the fuel cell; and
  correct the target humidity so as to be increased when an open time of the bypass valve becomes more than a second predetermined time which is shorter than the first predetermined time.

8. The fuel cell system according to claim 6, wherein the fuel cell system comprises a pressure control valve to control a pressure of a cathode gas to be supplied to the fuel cell; and
  when the bypass valve is forcibly and totally shut-off, based on an opening degree of the bypass valve before total shut-off of the bypass valve or on the flow rate of a cathode gas flowing through the bypass channel, an opening degree of the pressure control valve is made larger than the opening degree of the bypass valve before total shut-off.

* * * * *